(12) United States Patent
Wong

(10) Patent No.: US 9,069,939 B2
(45) Date of Patent: Jun. 30, 2015

(54) METHOD AND APPARATUS FOR STORING A SOFTWARE LICENSE

(75) Inventor: Ka Keung Wong, Purley Surrey (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/528,719

(22) Filed: Jun. 20, 2012

(65) Prior Publication Data

US 2012/0260352 A1 Oct. 11, 2012

Related U.S. Application Data

(63) Continuation of application No. 12/626,742, filed on Nov. 27, 2009, now Pat. No. 8,229,505.

(30) Foreign Application Priority Data

Nov. 27, 2008 (GB) .................................. 0821713.5

(51) Int. Cl.
*H04M 1/00* (2006.01)
*G06F 21/12* (2013.01)
*H04L 29/06* (2006.01)
*H04W 12/08* (2009.01)
*H04W 8/18* (2009.01)

(52) U.S. Cl.
CPC .............. *G06F 21/123* (2013.01); *H04L 63/10* (2013.01); *H04W 8/183* (2013.01); *H04W 12/08* (2013.01)

(58) Field of Classification Search
CPC ...................................................... H04L 63/10
USPC .............. 455/558, 414.1, 418, 410, 419, 566
See application file for complete search history.

(56) References Cited

U.S. PATENT DOCUMENTS

| 7,194,637 | B1 * | 3/2007 | Crawford | 713/153 |
| 2004/0214560 | A1 * | 10/2004 | Date et al. | 455/418 |
| 2008/0261655 | A1 * | 10/2008 | Carpenter et al. | 455/558 |
| 2012/0072995 | A1 * | 3/2012 | Crawford | 726/26 |

* cited by examiner

*Primary Examiner* — Sanh Phu
(74) *Attorney, Agent, or Firm* — Mintz Levin Cohn Ferris Glovsky and Popeo, P.C.

(57) ABSTRACT

In accordance with an example embodiment of the invention there is provided a method, comprising: associating an International Mobile Equipment Identity (IMSI) with a mobile telecommunication device, the IMSI configured to identify the device to a mobile telephone network; storing a software program in memory associated with the device; storing a licence, necessary for allowing the operation of the software program on the device, in memory associated with the device; and locking the licence to said IMSI such that the software application cannot be operated on the device without said IMSI being associated with the device; wherein, the licence and the IMSI are stored on the same memory medium such that they are transportable from the device together.

9 Claims, 6 Drawing Sheets

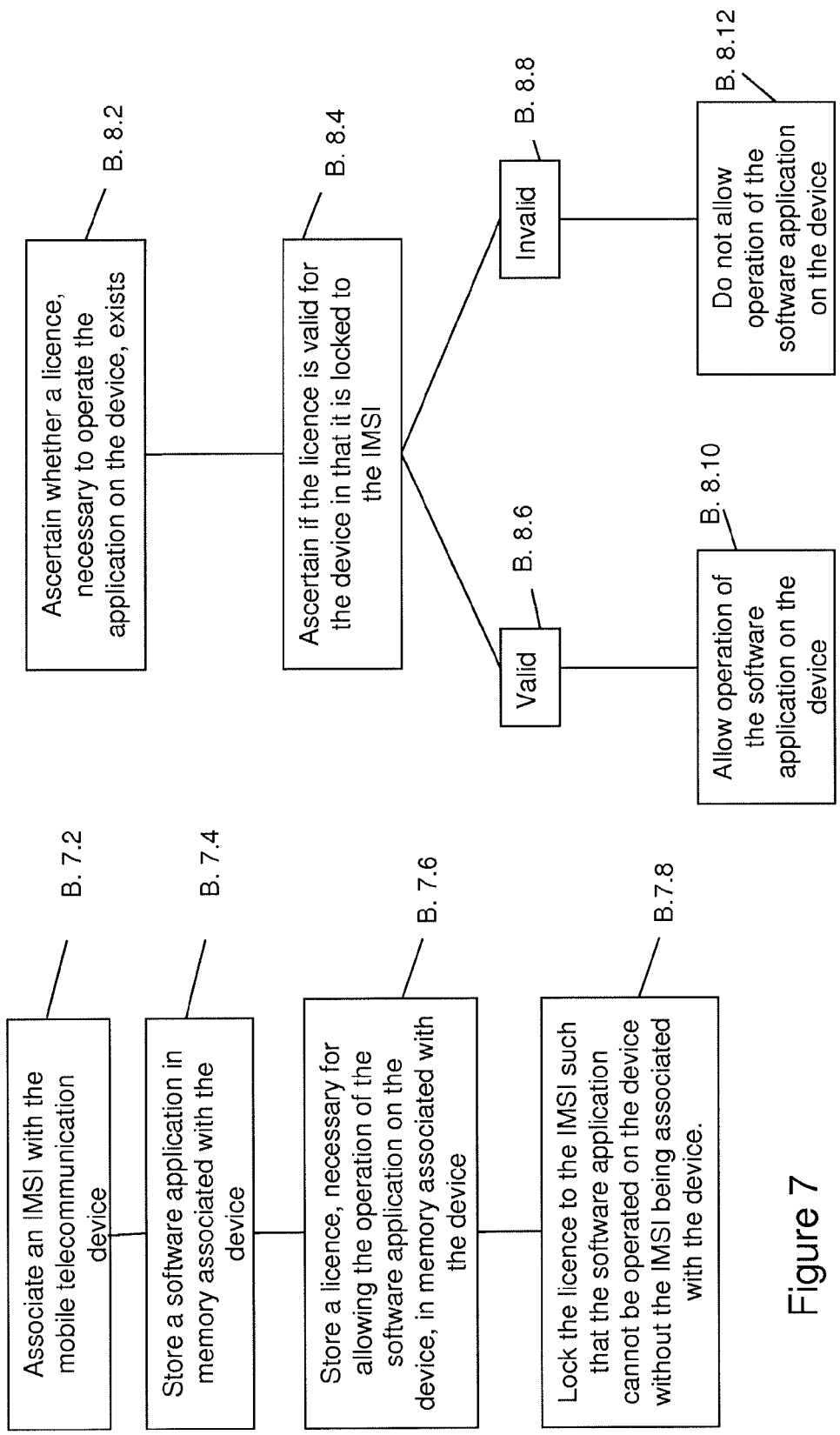

METHOD AND APPARATUS FOR STORING A SOFTWARE LICENSE

CROSS REFERENCE TO RELATED APPLICATION

This application is a continuation application of U.S. patent application Ser. No. 12/626,742 filed on Nov. 27, 2009 entitled now U.S. Pat. No. 8,229,505, "Method And Apparatus For Storing A Software License", which claims the benefit under 35 U.S.C. §119 of Great Britain Patent Application No. 0821713.5 filed Nov. 27, 2008, contents of the aforementioned applications are hereby incorporated by reference herein in their entirety.

RELATED APPLICATIONS

This application claims priority to Great Britain Application No. GB0821713.5, filed Nov. 27, 2008, which is hereby incorporated by reference in its entirety.

TECHNICAL FIELD

The present invention relates to software licences, and in some examples it relates to a method and apparatus in which a licence required for use of a software application may be transported from one device to another.

BACKGROUND TO THE INVENTION

Some software applications require a user to acquire a licence before it can be installed and/or run (operated). Licences for software applications that run on mobile communications devices are sometimes associated with the IMEI (International Mobile Equipment Identity) number of the mobile device on installation. This can mean that the licence will only allow the application, with which it is associated, to operate when the licence, and the application, are present on the device with the IMEI with which the licence is associated.

SUMMARY OF THE INVENTION

Various examples of the invention are set out in the claims.

According to a first aspect of the invention there is provided a method, comprising: associating an International Mobile Equipment Identity (IMSI) with a mobile telecommunication device, the IMSI configured to identify the device to a mobile telephone network; storing a software program in memory associated with the device; storing a licence, necessary for allowing the operation of the software program on the device, in memory associated with the device; and locking the licence to said IMSI such that the software application cannot be operated on the device without said IMSI being associated with the device; wherein, the licence and the IMSI are stored on the same memory medium such that they are transportable from the device together.

According to a second aspect of the invention there is provided an apparatus, comprising: at least one processor; and at least one memory including computer program code the at least one memory and the computer program code configured to, with the at least one processor, cause the apparatus to perform at least the following: associate an IMSI with a mobile telecommunication device, the IMSI configured to identify the device to a mobile telephone network; store a software program in memory associated with the device; store a licence, necessary for allowing the operation of the software program on the device, in memory associated with the device; and lock the licence to said IMSI such that the software application cannot be operated on the device without said IMSI being associated with the device; wherein, the licence and the IMSI are stored on the same memory medium such that they are transportable from the device together.

According to a third aspect of the invention there is provided a computer program product comprising a computer-readable medium bearing computer program code embodied therein for use with a computer, the computer program code comprising: code for associating an IMSI with a mobile telecommunication device, the IMSI configured to identify the device to a mobile telephone network; code for storing a software program in memory associated with the device; code for storing a licence, necessary for allowing the operation of the software program on the device, in memory associated with the device; and code for locking the licence to said IMSI such that the software application cannot be operated on the device without said IMSI being associated with the device; wherein, the licence and the IMSI are stored on the same memory medium such that they are transportable from the device together.

BRIEF DESCRIPTION OF THE DRAWINGS

For a more complete understanding of example embodiments of the present invention, reference is now made to the following descriptions taken in connection with the accompanying drawings in which:

FIG. 7 is a flow diagram of operations performed in an example embodiment; and

FIG. 8 is a flow diagram of operations performed in an example embodiment.

DESCRIPTION OF EXAMPLE EMBODIMENTS

Figure 1:
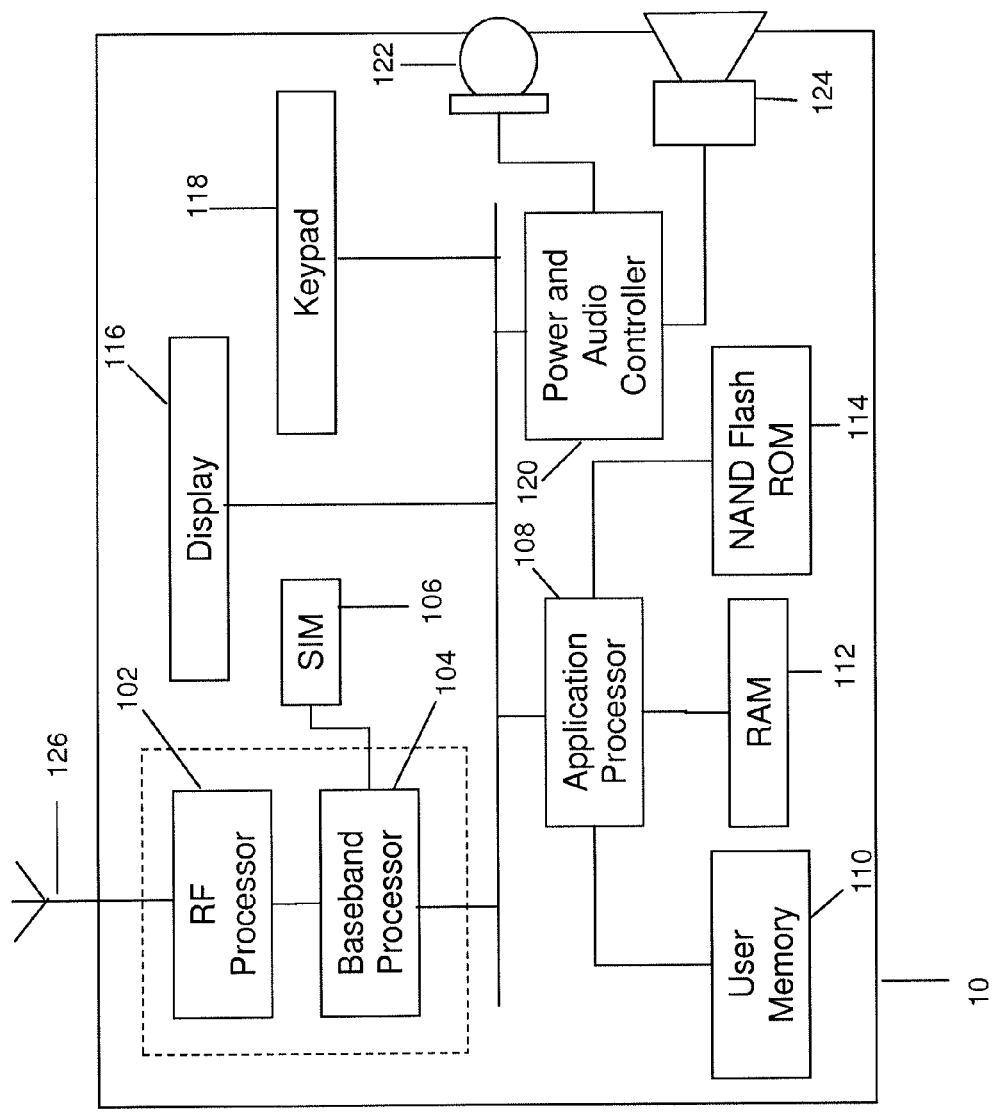
FIG. 1 is a block diagram illustrating the typical hardware architecture of a smartphone and which may form the computing platform for an example embodiment of the invention.

The term mobile telecommunication device, or mobile device, as used herein, is to be expansively construed to cover any communication device of any form including mobile telephones, data recording devices, hand held and personal computers such as Personal Digital Assistants (PDAs), smart telephones, communicators which combine communications, image recording and/or playback and computing functionality within a single device, and other forms of wireless and wired information devices, including digital cameras, MP3 and other music players, and digital radios.

Software licences that are required both for the legal use of the software i.e. such that no legal liability is incurred through use, and for the technical use of the software i.e. the software will not operate without having verified an associated licence may in some examples be in either data (soft) or hardware form. For instance, in one example, with regard to personal computers some applications, such as Autocad (®) for example, require a dongle to be present (usually plugged into a serial or parallel socket on the computer) before the application will operate. In this way, an organisation may have a copy of the application installed on several different computers, such as at different office locations, but will only be able to use one of them at a time if they only have one dongle. The copy that will be operated will be the one that is installed on the computer in which the dongle is plugged. The organisation may of course purchase more dongles for the operation of more than one copy of the application simultaneously. The dongle in this example acts as a hardware licence.

In some examples licences may also be time-based in that they expire after a certain time or date, or alternatively, in other examples, may be perpetual. In yet further examples they may be based on the number of usages. For example, a licence may not be time restricted, but instead monitor the number of times a software application is used. In other examples combinations of such may be used. For example, a licence may prescribe a limited number of uses within a particular time period.

In this regard, in one example the software application itself prohibits its operation if the licence is not present. Alternatively, or additionally, in other examples it could be that the computer prohibits the operation of the software application if the licence is not present, perhaps using, in one example, a central applications manager in an operating system present on the device.

In some examples it is also possible to install software applications onto mobile telecommunications devices. Alternatively, or additionally, in other examples it is possible to operate software applications from/on mobile telecommunications devices without necessarily installing them on those devices, in that the device may act as a controller and display unit. Similarly, in some examples some of these applications require a licence for allowing their operation. In some examples the licence may be installed on the mobile device, its presence acting to allow access to, and operation of, the application. In some examples such software applications and licences may be downloaded onto the mobile device either wirelessly or by wired connection. Alternatively, in other examples the applications may already be pre-installed during manufacture.

As noted previously, in previous mobile devices, software licenses can be locked to the device IMEI. The IMEI number is unique to every mobile communication device. The IMEI number is used by the GSM (Global System for Mobile) communications network to identify valid devices and therefore, in theory, can be used to stop a stolen telephone from accessing the network. For example, if a mobile telephone is stolen, the owner can call his or her network provider and instruct them to "ban" the telephone using its IMEI number. This renders the phone useless, regardless of whether the telephone's SIM is changed. The IMEI is only used to identify the device, and has no permanent or semi-permanent relation to the subscriber.

Accordingly, if a user obtains a new mobile device his or her MEI number will change and so even if the user installs the application and the licence onto the new device it will not operate because the new IMEI number is not associated with the licence. In these circumstances the user must obtain a new licence if he wishes to operate the application. This new licence is often sold at a price by the supplier of the application and therefore the user must pay again for using the application which he has possibly already purchased.

A first example embodiment of the invention will now be described.

The first example embodiment provides a method of operating a mobile telecommunication device. In the example the device requires an IMSI for identifying the device to a mobile telephone network, and the device is capable of operating a software application. In order to identify the device to the mobile network within the example an IMSI is associated with the device. In addition, within the example a software application is stored in memory associated with the device. In order to allow the software to operate within the example a licence is also stored in memory associated with the device. In this example the memory is a subscriber identity module, on which, in this example, the IMSI is also stored. In the example embodiment the licence is locked to the IMSI such that the software application cannot be operated on the device without the IMSI being associated with the device.

Within the example embodiment the "IMSI" (International Mobile Subscriber Identity) is a unique number associated with a GSM network mobile telephone user. In the example it may be stored on a SIM card (Subscriber Identity Module) located inside the device and may be sent by the device to the GSM network. Within the example it may also be used to acquire other details of the mobile device in the Home Location Register (HLR) or as locally copied in the Visitor Location Register.

The phrase "associating an IMSI with the device" used in this example may involve the IMSI being stored on a subscriber identity means such as a SIM card, the SIM card being electrically connected with the electronics of the mobile device. Alternatively, in another example the IMSI may be stored on the mobile device itself. For instance, in one example the IMSI may be stored on memory. This memory may be integral with the device or may be removable from the device. The memory would ideally be non-volatile.

In the first example embodiment a SIM card is defined as a Subscriber Identity Module (SIM). The SIM Card in this example securely stores the service-subscriber key (IMSI) used to identify a subscriber on mobile telephony devices (such as computers) and mobile telephones. In this example the SIM card allows users to change telephones by simply removing the SIM card from one mobile telephone and inserting it into another mobile telephone or broadband telephony device. The term "USIM" (Universal Subscriber Identity Module) may be applied herein instead of, or as well as, the term "SIM".

The phrase "memory associated with the device" used in this example embodiment may mean, in one example, memory which is integral with the device, such as for example ROM, or may be, in another example, memory which is removable from the device, such as for example flash memory. In one example the memory may be a SIM card which may be the same SIM card as the one described above in relation to the IMSI. In one example the memory is non-volatile, but in another example volatile. In another example the memory is remote from the device, such as, for example, located at server, with which the device may communicate. Accordingly, the software application may in one example be stored on memory integral with the device, and/or in another example on memory remote from the device. Furthermore, in one example the licence may be stored on memory integral with the device, and/or in another example on memory remote from the device. In one example the memory integral with the device may be a SIM card.

If in one example the software application is stored on memory remote from the device then it may be operated (executed) on the remote memory or transferred as necessary to a computing means, which may be the mobile device in question, for operation (execution) thereon. If in one example the licence is stored on memory remote from the device then it may be transferred to a computing means, which may be the mobile device in question, for the checking of its existence and/or validity, or its existence and/or validity may be ascertained remotely by the mobile device.

The phrase "locking the licence to said IMSI" used in this example embodiment means that the licence is only valid for a particular software application when used in association with a mobile device which has the IMSI in question. In other words, in this example embodiment the licence will only allow operation of the software application on, or in conjunction with, a mobile device with which the IMSI in question is associated. In one example, the licence may be software. When first used it may be locked to a particular IMSI number such that the IMSI number is in some way included in the coding of the licence or in a file associated with the licence. Alternatively, in another example a database of licences and the respective associated IMSI numbers may be maintained, possible remotely, for access by the device for checking that a particular software application may be allowed or be operated. Other ways of locking the IMSI and the licence together are possible in other examples.

Within this example embodiment the intention behind the word "lock" is that a typical user would not be able to change the IMSI to which a licence is locked. However, this does not preclude the possibility that the licence issuer or some other authorised body would be able to do this.

In one example, the licence may be hardware. For instance, in one example the licence may take the form of an electronic circuit included in removable memory, such as a flash memory device. In one example the electronic circuit may be integral with the subscriber identity means. In one example the IMSI may be locked to the licence in that the IMSI number is stored on the device, or the device may have its own unique identifying reference which may be stored in a database along with the respective IMSI as discussed above.

Within the first example embodiment the subscriber identity means identifies the mobile telecommunication device to the mobile telephone network. The subscriber identity means includes the IMSI and a licence necessary for the mobile device to operate a software application, wherein the licence is locked to the IMSI. In the example the subscriber identity means may be a SIM card. In the example the subscriber identity means may be portable between mobile devices so that the licence remains with the subscriber identity means such that the software application may be unlocked on any device with which the subscriber identity means is associated. As such, the first example embodiment supports the concept of user portability of a licence from one mobile device to another. This may be effected in the first example embodiment by the IMSI and licence combination being moved from one device to another and/or by the device, with which the IMSI/licence combination is associated, being changed. In this regard, in the first example embodiment the licence may be considered to be a secure portable registry.

A second example embodiment of the invention will now be described in more detail.

The second example embodiment makes use of a smartphone as the mobile device. A typical smartphone architecture used by the second example embodiment is described next with respect to FIG. 1.

With reference to FIG. 1, an example smartphone 10 of the second example embodiment comprises hardware to perform the telephony functions, together with an application processor and corresponding support hardware to enable the phone to have other functions which are desired by a smartphone, such as, for example, messaging, calendar, word processing functions and the like. In the example of FIG. 1 the telephony hardware is represented by the RF processor 102 which provides an RF signal to antenna 126 for the transmission of telephony signals, and the receipt therefrom. Additionally provided in this example is baseband processor 104, which provides signals to and receives signals from the RF Processor 102. In this example the baseband processor 104 also interacts with a subscriber identity module 106, of which further details will be given later.

Within this example also typically provided is a display 116, and a keypad 118. These are controlled in this example by an application processor 108, which is often (although not always) a separate integrated circuit from the baseband processor 104 and RF processor 102, although single chip solutions may also be used. In this example a power and audio controller 120 is provided to supply power from a battery (not shown) to the telephony subsystem, the application processor, and the other hardware. Additionally, in this example the power and audio controller 120 also controls input from a microphone 122, and audio output via a speaker 124.

Within this example, in order for the application processor 108 to operate, various different types of memory are often provided. Firstly, in this example the application processor 108 may be provided with some Random Access Memory (RAM) 112 into which data and program code can be written and read from at will. In this example code placed anywhere in RAM can be executed by the application processor 108 from the RAM.

Additionally provided in this example is separate user memory 110, which is used to store user data, such as, for example, user application programs (typically higher layer application programs which determine the functionality of the device), as well as user data files, and the like.

As mentioned previously, in this example, in order for the application processor 108 to operate, an operating system is necessary, which must be started as soon as the smartphone system 10 is first switched on. In this example the operating system code is stored in a Read-Only Memory, and in this example the Read-Only Memory is NAND Flash ROM 114. In this example the ROM will store the necessary operating system component in order for the device 10 to operate, but other software programs may also be stored, such as, for example, application programs, and the like, and in particular those application programs which are mandatory to the device, such as, in the case of a smartphone, communications applications and the like. In this example these would typically be the applications which are bundled with the smartphone by the device manufacturer when the phone is first sold. Further applications which are added to the smartphone by the user would usually be stored in the user memory 110, for example.

Figure 2:
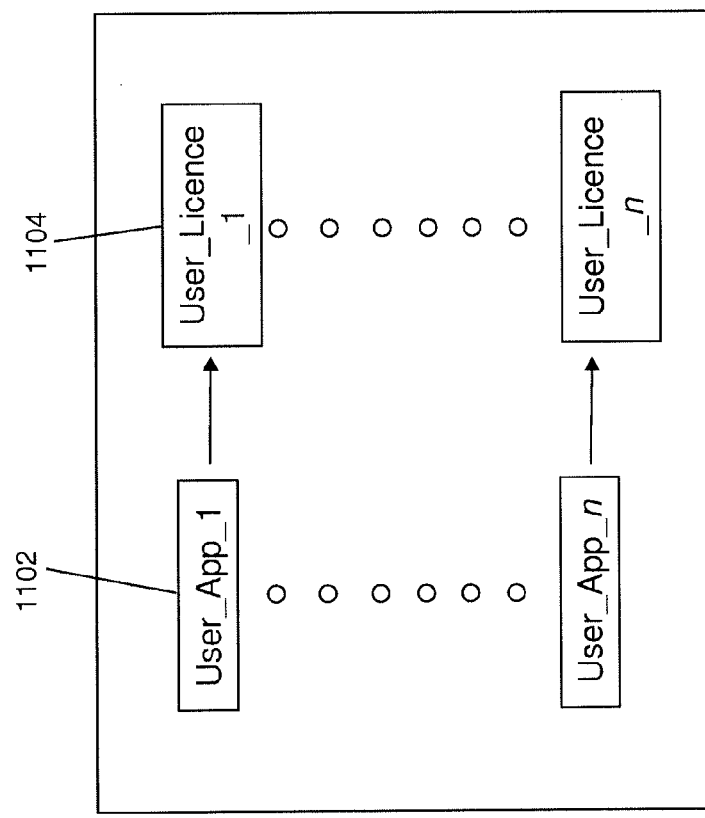
FIG. 2 is a block diagram of a user memory in an example embodiment.

FIG. 2 illustrates the user memory 110 of the second example embodiment. In particular, in the second example embodiment, as described above, user applications 1102 that have been stored on the smartphone by the user are stored in the user memory. Associated with the user applications user_app_1 to user_app_n are associated licences to allow use of the respective user installed applications. For example, user_licence_1 to user_licence_n (1104) are also, in this example, stored on the user memory 110, at least after first installation. A user licence may be stored for each user installed application, as shown in FIG. 2, or, in other examples some user applications may not need licences, and hence no corresponding licence may be stored. Hence, in some examples, only a subset of user applications, the subset comprising one or more of the user installed applications, have associated licences. Moreover, in other examples, any particular user licence may cover the use of more than one of the user installed applications.

Figure 3:
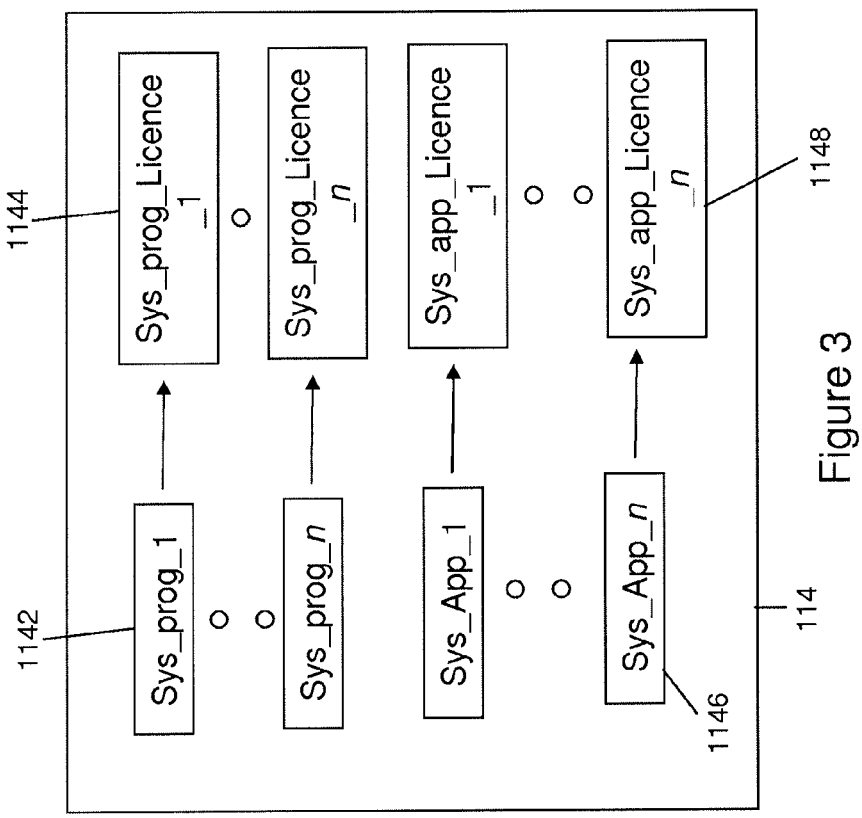
FIG. 3 is a block diagram of a system memory in an example embodiment.

FIG. 3 shows a similar situation for the NAND Flash ROM memory 114 of the present second example embodiment. Particularly, in the present second example embodiment, system programs (sys_prog_1 to sys_prog_n) 1142 may be stored on the ROM 114. Associated with the system programs 1142 are system program licences 1144 (sys_prog_licence_1 to sys_prog_licence_n). Additionally, with the second example embodiment, system applications, such as communications applications, diary applications, calendar applications, and the like, may also be stored on the ROM 114. Therefore, in the second example embodiment the system applications 1146 (sys_app_1 to sys_app_n) are stored on ROM 114. Associated with the system applications are the system application licences 1148 (sys_app_licence_1 to sys_app_licence_n). As with the user installed applications, in the second example embodiments a corresponding system program licence or a system application licence may be provided for each system program or system application. In other examples, however, it may be the case that a system program or system application does not need a corresponding licence and hence no such licence is stored. In yet further examples, however, only a subset of the system programs or the system applications may have licences stored, or in another example, a single system program licence or system application licence may cover the use of multiple system programs or system applications.

Figure 4:
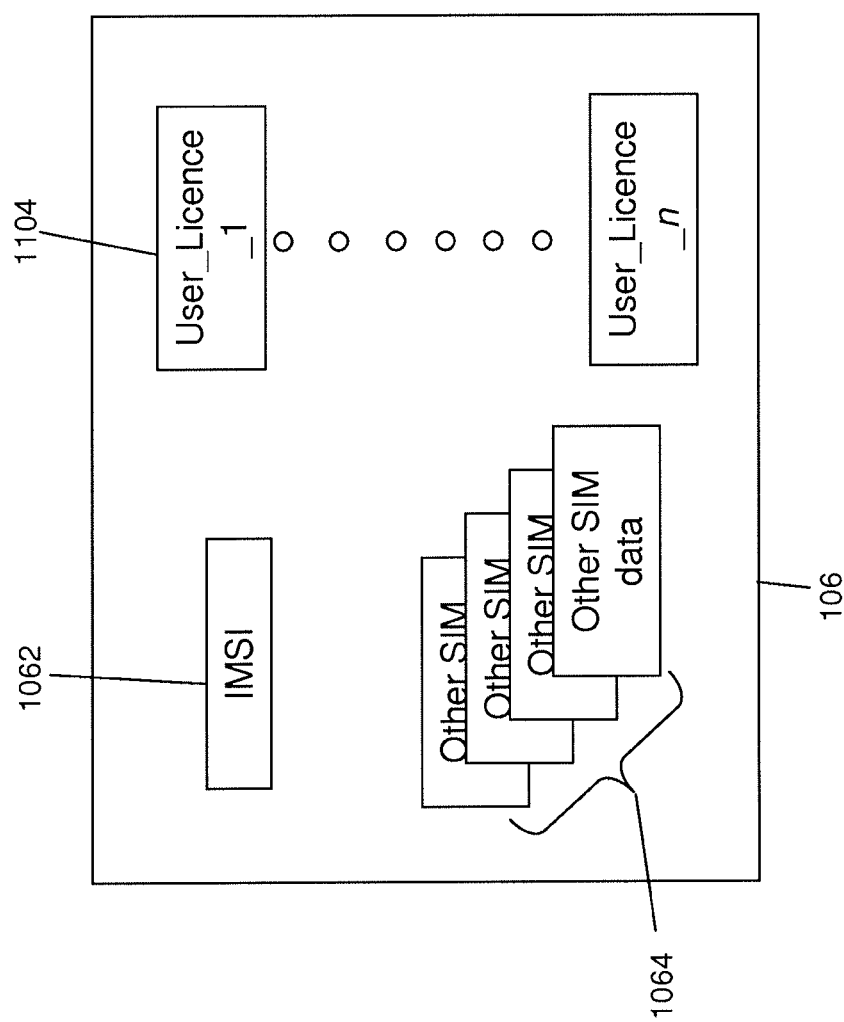
FIG. 4 is a block diagram of a subscriber identity module in an example embodiment.

In the present second example embodiment a licence required for the use of a particular software program is stored together with the IMSI 1062, and is locked to the IMSI such that the computer program can only be run on the smartphone 10 if the smartphone 10 is associated with the particular IMSI to which the licence is logged. In addition, within the present second example embodiment, as noted a particular licence is stored co-located with the IMSI 1062, on the same (removable) memory. In the second example embodiment, this removable memory is the subscriber identity module 106 as shown in FIG. 4.

More particularly, in the present second example embodiment the subscriber identity module 106 stores the IMSI data 1062, as well as other SIM related data 1064. In addition, in the present example embodiment any user licence data 1104, corresponding to user licences for user installed applications 1102 stored in the user memory 110 is also stored on the SIM module 106. As mentioned, in the present example embodiment, a user licence stored on the SIM 106 is locked to the IMSI 1062, also stored on the SIM 106.

Figure 5:
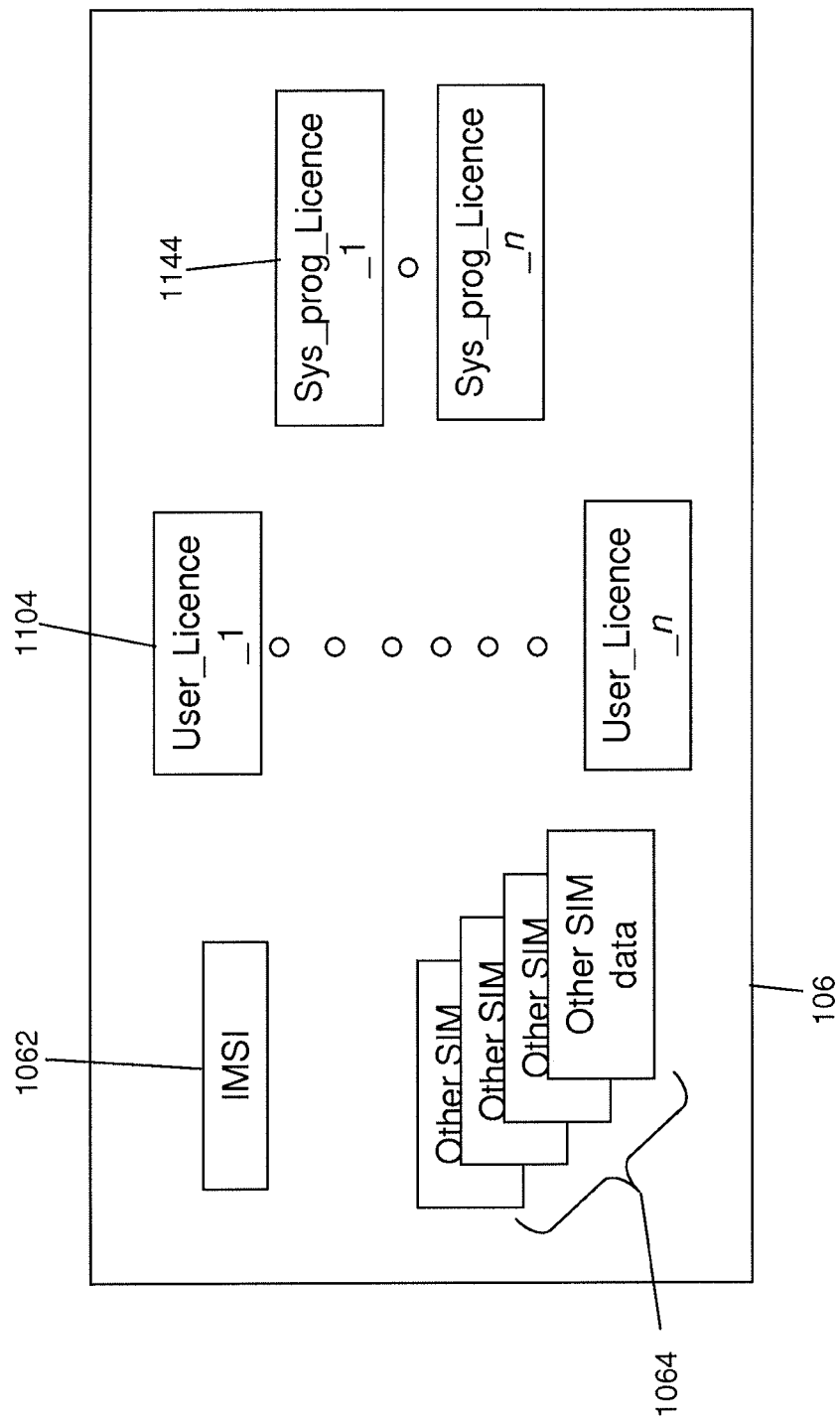
FIG. 5 is a block diagram of a subscriber identity module in a variant of an example embodiment.
Figure 6:
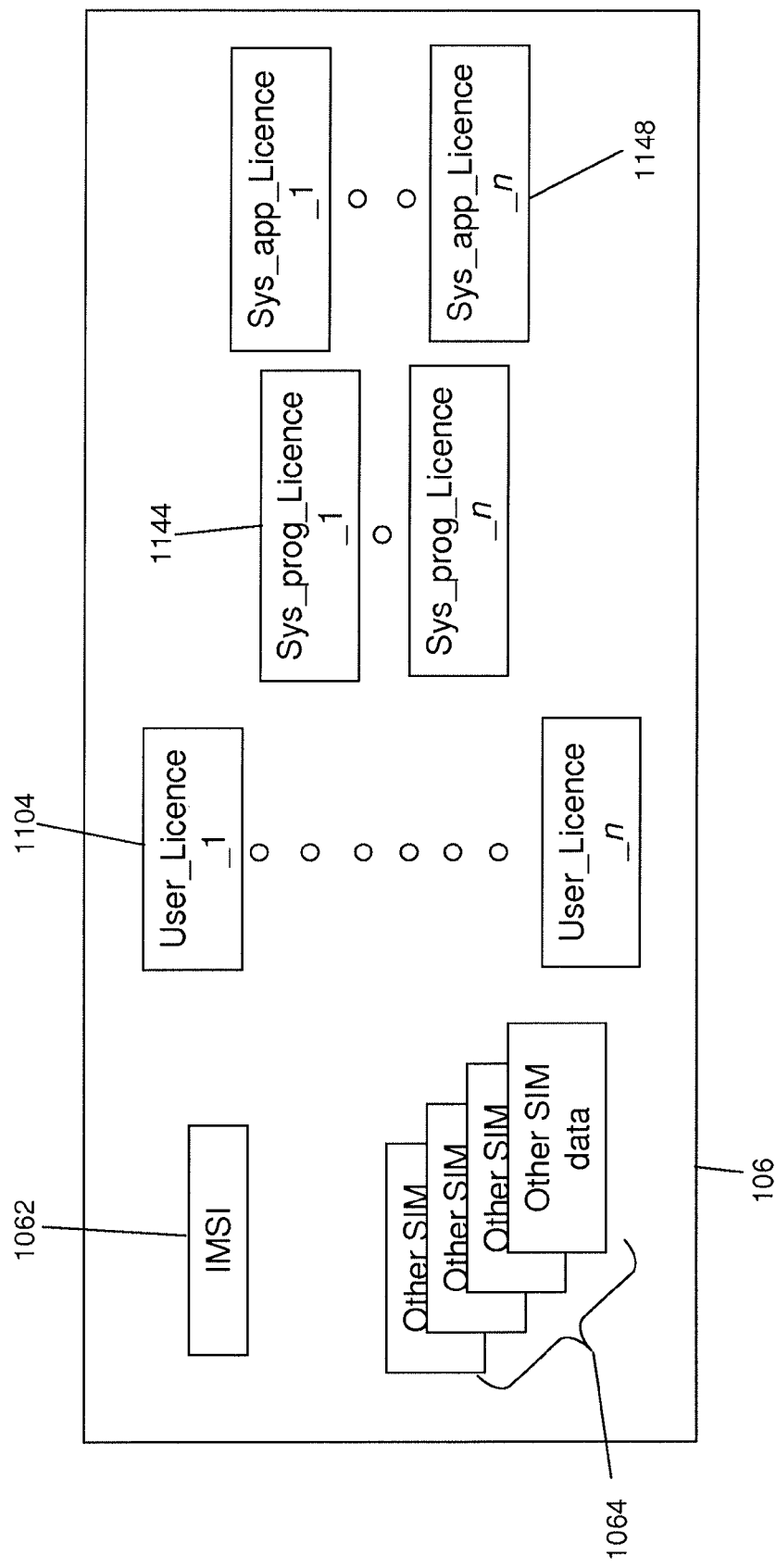
FIG. 6 is a block diagram of a subscriber identity module in a variant of an example embodiment.

In other examples, in addition to storing the user licence data 1104, the SIM 106 can also store system program licence data 1104, as shown in FIG. 5. In a further example shown in FIG. 6, in addition to storing the user licence data 1104, and the system program licence data 1144, the system application licence data 1148 can also be stored on the SIM. It will also be understood that in further examples a subset of any of these types of licences may be stored. For example, in one example, only system application licence data may be stored, or system program licence data, or a combination of the two. Similarly, in other examples, not all of the licence data available in the various memories of the device need be stored at the SIM 106, and a subset of licences can be stored. In one example, the SIM stores licences of applications that a user wishes to also use on another mobile device to which the SIM 106 may be transferred. In one example, the device 10 may provide an interface to the user, to allow the user to specify which licences are stored on the SIM 106. The user may specify a subset of licences of various different types, including licences for user installed programs; for system applications, and for system programs.

In the second example embodiment, the reason for storing the licence data locked to the IMSI on the same memory as that in which the IMSI is stored is such that, when the IMSI is transferred on the memory to another mobile device, the licence data is also transferred with it. This allows a user installed application program, for example, or a system application, for example, or system program, for example, on another smartphone device to be used on the basis of the licence data that is transferred with the IMSI. In this way, in the second example embodiment, software licences become as portable between devices as the IMSI itself.

In the second example embodiment, as noted the IMSI 1062 is stored on the SIM module 106 as is any licence data 1104, 114, or 1148, to be transferred. If the user removes the SIM module 106 from the smartphone 10, and places this module in another smartphone device, then that smartphone device will be able to register with a mobile phone network using the IMSI 1062, and applications installed on that second smartphone device, but which require a software licence for their use, can be used based on the licences that have been transferred. In this respect, the licences that have been transferred should, for example, relate to the software applications on the smartphone device. That is, for example, the software applications on the new smartphone device should be software applications to which the licences relate.

FIG. 7 shows a flow diagram of the operation of the second example embodiment. In the example the mobile telecommunication device in the form of smartphone 10 requires an IMSI for identifying it to a mobile telephone network. The device is also capable of operating a software application, in that the application may be executed (or "run") on it. Firstly an IMSI is associated with the device at block 7.2. For example, this may comprise inserting a SIM module 106 having IMSI data 1062 stored thereon into the device 10.

Next, in the example embodiment a software application is stored in memory associated with the device at block 7.4. For example, a user may install a user application on the smartphone 10, that is stored in user memory 110. Then, at block 7.6, the program licence, necessary for allowing the operation of the installed software application on the device, is stored in memory associated with the device. For example, the licence may first be stored in the user memory 110, but is also stored on the SIM 106, as described above. Once stored on the SIM 106 the licence data may be deleted from the user memory 110. In other examples, the licence data may be stored straight to the SIM 106, and not stored in the user memory 110 at all. Likewise, in some examples, system licences 1144 or 1148 may be stored on the SIM 106, having been copied from ROM 114. Similarly, in some examples they may be stored straight to the SIM 106 without being stored in the ROM 114.

Once the licence (user or system) has been saved to the SIM 106, in the present example embodiment the licence data is locked to the IMSI such that the software application cannot be operated on the device without the IMSI being associated with the device 40. This is shown at block 7.8. In the present example embodiment, "locking" the licence to the IMSI may mean, for example, inserting the IMSI number itself, into a protected section of the licence data. In another example, only part of the IMSI may be inserted. In a further example, another code derived from the IMSI may be inserted into the licence. For example, the IMSI may be subject to a hash function to provide a hash value of the IMSI, and the hash value is stored in the licence.

FIG. 8 illustrates the further operation of the second example embodiment, and in particular exemplifies how a locked licence may be checked to determine if a software program on the smartphone 10 may be run. The starting point for FIG. 8 is that the smartphone 10 is to run a software program, which may, for example, have been installed on the device by the user, or may for example be a system program, or, in another example, may have been downloaded from a remote download server. The software program may be being run at the command of the user, for example, or, in another example, the software program may be being run automatically by the device, for example as the result of a timer operation, or at the request of the operating system.

In order to run the software program, in the present second example embodiment at block 8.2 it is first necessary to ascertain whether a licence, necessary to operate the program on the device, exists. As part of this, the second example embodiment also ascertains as to whether in fact a licence is required. As noted previously, some software programs may not require a licence to be present in order to be run.

If it is determined at block 8.2 that a licence is required, and exists, within the second example embodiment at block 8.4 it is ascertained if the licence is valid for the device in that it is locked to the IMSI 1062. For example, the protected data area of the licence in which the IMSI data, or data derived from the IMSI data, is stored is examined, and compared with the IMSI 1062 stored on the SIM 106. At block 8.6 and block 8.8 of the second example embodiment an evaluation is undertaken to determine that the licence is valid i.e. that the licence relates to the IMSI presently being used by the device, and if the licence is valid then the device of the second example embodiment allows the operation of the software application at block 8.10. On the other hand if the licence is invalid the device of the second example embodiment does not allow operation of the software application, as shown at block 8.12.

Thus, within the second example embodiment a licence or licences that are required to run one or more software programs on a smartphone device are "locked" to an IMSI, in that the licence will allow its associated software program to run on the smartphone device that is presently making use or otherwise associated with the IMSI to which the licence is locked. In order to allow for portability of the licence, in the second example embodiment the IMSI is stored on a subscriber identity module, or SIM card, and any licence that is required to be portable with the IMSI is also stored on the subscriber identity module. This allows the licences to be readily and easily transferred from one device to another with the IMSI to which they are locked.

In another example, the IMSI and licences to be transferred are not stored on a subscriber identity module, but are instead stored on a removable memory card of any type, such as an SD, SDHC, or other type of removable memory, such as any other type of flash card.

Without in any way limiting the scope, interpretation, or application of the claims appearing below, a technical effect of one or more of the example embodiments disclosed herein is that by storing the IMSI and the licences on the same removable storage media, both the IMSI and the licences locked to the IMSI can be readily and easily transferred from one device to another.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1, and one example of a computer readable medium described and depicted in FIG. 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    associating an international mobile subscriber identity with a mobile device, the international mobile subscriber identity configured to identify the mobile device to a mobile telephone network; and
    locking a license to the international mobile subscriber identity such that a software program cannot be operated on the mobile device without the international mobile subscriber identity being associated with the mobile device, wherein the license includes an expiration;
    wherein the license and the international mobile subscriber identity are stored on at least one removable memory medium associated with the mobile device, wherein the at least one removable memory medium comprises at least one of a removable memory card or a subscriber identity module configured to enable removal of the at least one removable memory medium storing the license locked to the international mobile subscriber identity to enable operation at another mobile device, and wherein the software program is allowed to operate on the mobile device, or the other mobile device if the license is ascertained as valid and not allowed to operate on the mobile device if the license is ascertained as invalid.

2. The method according to claim 1, wherein the software program is stored on memory integral with the mobile device, on memory remote from the mobile device, or a combination of both.

3. An apparatus, comprising:
    at least one processor; and
    at least one memory including computer program code, the at least one memory and the computer program code configured to, with the at least one processor, cause the apparatus to perform at least the following:
        associate an international mobile subscriber identity with a mobile device, the international mobile subscriber identity configured to identify the mobile device to a mobile telephone network; and
        lock the license to the international mobile subscriber identity such that the software application cannot be operated on the mobile device without the international mobile subscriber identity being associated with the mobile device, wherein the license includes an expiration;

wherein the license and the international mobile subscriber identity are stored on at least one removable memory medium associated with the mobile device, wherein the at least one removable memory medium comprises at least one of a removable memory card or a subscriber identity module configured to enable removal of the at least one removable memory medium storing the license locked to the international mobile subscriber identity to enable operation at another mobile device, and wherein the software program is allowed to operate on the mobile device if the license is ascertained as valid and not allowed to operate on the mobile device if the license is ascertained as invalid.

4. The apparatus according to claim 3, wherein the software application is stored on memory integral with the mobile device, on memory remote from the mobile device, or a combination of both.

5. A computer program product comprising a non-transitory computer-readable medium bearing computer program code embodied therein for use with a computer, the computer program code, when executed by at least one processor, causing operations comprising:

associating an international mobile subscriber identity with a mobile device, the international mobile subscriber identity configured to identify the mobile device to a mobile telephone network; and locking the license to said international mobile subscriber identity such that the software application cannot be operated on the mobile device without said international mobile subscriber identity being associated with the mobile device, wherein the license includes an expiration;

wherein the license and the international mobile subscriber identity are stored on at least one removable memory medium associated with the mobile device, wherein the at least one removable memory medium comprises at least one of a removable memory card or a subscriber identity module configured to enable removal of the at least one removable memory medium storing the license locked to the international mobile subscriber identity to enable operation at another mobile device, and wherein the software program is allowed to operate on the mobile device if the license is ascertained as valid and not allowed to operate on the mobile device if the license is ascertained as invalid.

6. The computer program product according to claim 5, wherein the software application is stored on memory integral with the mobile device, on memory remote from the mobile device, or a combination of both.

7. A method, comprising:

associating an international mobile subscriber identity with a mobile device, the international mobile subscriber identity configured to identify the mobile device to a mobile telephone network; and locking a license to the international mobile subscriber identity such that a software program cannot be operated on the mobile device without the international mobile subscriber identity being associated with the mobile device, wherein the license includes an expiration;

wherein the license and the international mobile subscriber identity are stored on the same removable memory medium associated with the mobile device, wherein the same removable memory medium comprises a removable memory card or a subscriber identity module configured to enable removal of the at least one removable memory medium storing the license locked to the international mobile subscriber identity to enable operation at another mobile device, and wherein the software program is allowed to operate on the mobile device if the license is ascertained as valid and not allowed to operate on the mobile device if the license is ascertained as invalid.

8. The method according to claim 1, wherein the expiration includes at least one of a time, a date, a number of usage, or a combination thereof.

9. The method according to claim 1, wherein the enabled operation at the other mobile device includes the software program being allowed to operate on the other mobile device if the license is ascertained as valid and not allowed to operate on the other mobile device if the license is ascertained as invalid.

* * * * *